Nov. 8, 1955 V. R. HOLMGREN 2,723,358
STATOR SLOT WEDGE
Filed Sept. 17, 1954
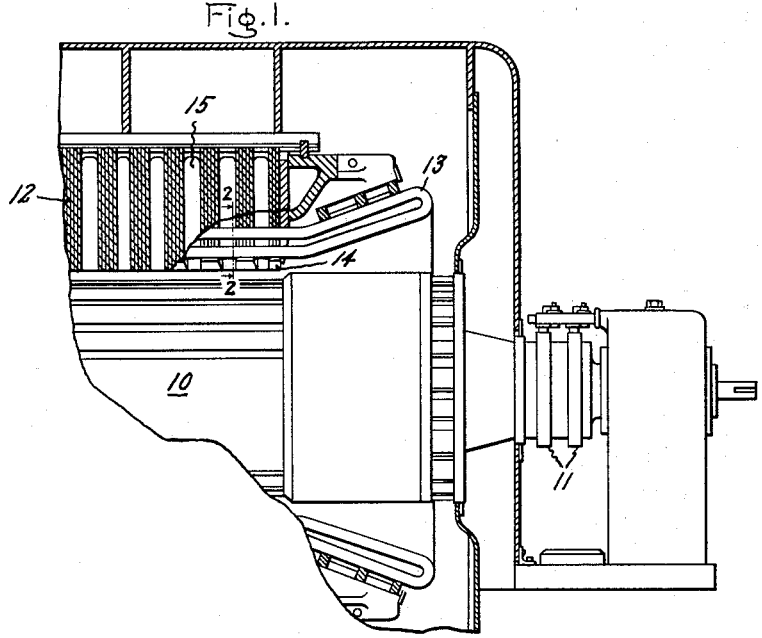
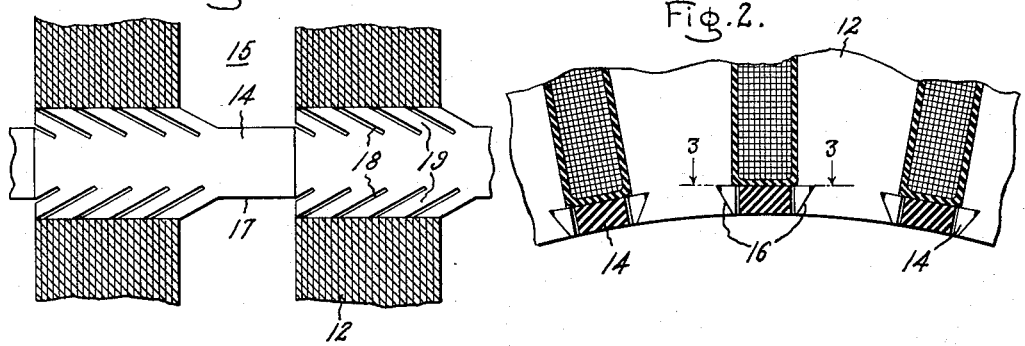
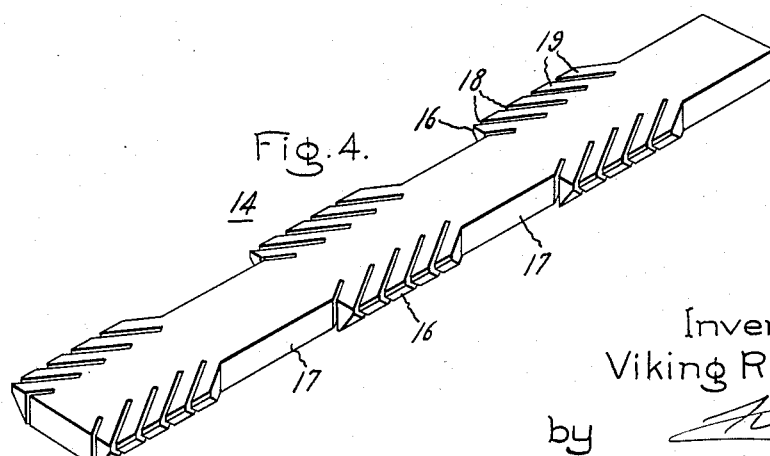
Inventor:
Viking R. Holmgren
by Kiess
His Attorney

United States Patent Office 2,723,358
Patented Nov. 8, 1955

2,723,358
STATOR SLOT WEDGE

Viking R. Holmgren, Lynn, Mass., assignor to General Electric Company, a corporation of New York Application September 17, 1954, Serial No. 456,837

1 Claim. (Cl. 310—214)

This invention relates to slot wedges for a dynamo-electric machine or the like, and has particular significance in connection with the pressure wedge for retaining a winding element in a winding slot of a laminated core.

Conventionally, dynamo-electric machine laminated cores provided with winding slots are made by assembling already slotted punchings or laminations into a unitary assembly. Because of the requisite manufacturing and assembly tolerances, the slot edges presented by the various punchings do not line up perfectly. Thus when a winding element is subsequently put in the slot, and then a slot wedge is driven in to hold the winding in place, considerable difficulty is experienced in getting the wedge to be tight in the slot due to the fact that in driving, the wedge material is sheared off on its sides by the rough edges presented by the punching edges in the slot, and when the wedge is driven to its final location, it is loose.

The main problem presented with respect to stator wedges is that after being installed in the stator they be prevented from coming loose during operation of the generator. Various types of stator wedges have been used without complete success in restraining the stator wedge against any movement whatever in the stator.

Heretofore it has been known to use wedges of wood or other substantially non-resilient material with, however, the disadvantage that upon assembly the wedge surfaces are "planed off," as above described, so that each wedge becomes loose, noisy, and apt to move when the machine is in operation. This movement of the wedge often tends to block off the ventilating passages, thus impeding the flow of ventilating medium for the machine. Furthermore, it has been conventional practice to attempt to wedge the wedges against each other, a plurality of short, split or tapered wedges being used, but this entails a larger number of pieces which are difficult to install and very often cannot be used over again when the machine is repaired.

Accordingly an object of this invention is to provide a stator wedge which when inserted into the stator will lock itself against movement relative to the stator.

A further object of the present invention is to provide a dynamo-electric machine slotted wedge of plastic material having a mechanical design such that the slot wedge will be substantially insensitive to small misalignment of adjacent punching edges, thereby to provide a slot wedge of improved mechanical design and of a chemical composition which makes allowance for high mechanical and thermal stresses.

Other objects and advantages will be apparent from the following description taken in connection with the accompanying drawings, in which Fig. 1 is a partial sectional elevation of a dynamo-electric machine such as a large generator having a stator core portion provided with the improved slot wedge; Fig. 2 is a cross sectional view taken on the line 2—2 of Fig. 1; Fig. 3 is a cross sectional view taken on the line 3—3 of Fig. 2; and Fig. 4 is a perspective view of the slot wedge.

Generally stated, the invention is practiced by providing a stator slot wedge with special resilient locking finger portions for maintaining the armature winding of a dynamo-electric machine in place and which, when inserted into the dynamo-electric machine, locks itself against movement relative to the stator.

Referring now to Fig. 1, the invention is shown in connection with a dynamo-electric machine having a rotor core portion 10 with a rotor winding (not shown) adapted to be energized through slip rings 11 in a conventional manner to provide a rotating D. C. excited field arranged to electrodynamically cooperate with a laminated stator core portion. The laminated stator core portion comprises a plurality of axially separated stacks of laminations or punchings 12 provided with winding slots, with an element of an armature winding 13 arranged in each winding slot and held in place therein by one or more dovetail slot wedges 14.

In machines of this type, the stacks of stator punchings 12 are axially spaced to provide ventilating medium passages 15. The slot wedge of the invention is, as most clearly indicated in Fig. 4, provided with tapered or dovetail side faces 16 longitudinally interspaced by perpendicular or squared off portions 17 which are (after the slot wedge has been driven into place) in substantial alignment with the interstack ducts 15 so that the tapered sides of the slot wedge will not cut down on the flow of cooling medium (conventionally air or hydrogen). The slot wedge may be conveniently made by molding a high strength organic plastic material such as one of the resin-bonded cloth laminates to the desired shape. The material should, in finished state, be somewhat resilient and I have found it desirable to use a molded resinous compound comprising a molded phenol-formaldehyde resin binder with a cloth or rag filler. In order to obtain sufficient strength in the material it is preferable to employ long fiber filler such as, for example, chopped rags. The organic plastic binder may alternatively comprise, for example, organic plastics of the phenol-aldehyde, urea-aldehyde and melamine-aldehyde types. A well known example of a product of this type is "Textolite." "Textolite" is a laminated plastic material which is resistant to ordinary wear and tear, acids, alkalis, heat and other damaging agents.

The "Textolite" or similar material is cut into blocks which are slightly wider than the wedge slot and substantially equal in length to the distance between the start of one air gap to the beginning of the next air gap (Fig. 3). This size is by way of example only since the wedge may extend across a plurality of ventilating gaps 15 (see Fig. 4). After molding and cutting to length, the solid wedge is provided with a plurality of parallel, longitudinally spaced slots 18 which are disposed at an acute angle to the side faces 16 of the wedge 14 and extend through the thickness thereof. The slots 18 define therebetween a plurality of wedge tangs 19. These cuts are only made in that portion of the wedge which will contact the stator punchings 12 of the dynamo-electric machine. The squared off portions 17 of the slot wedge, which are in substantial alignment with the interstack ducts 15, are reduced in width so the slot wedge will not abstract the flow of cooling medium.

The wedge tangs 19 formed between the slots 18 act as a plurality of cantilever beams when inserted into the stator. The wedge is inserted into the stator slot in the same direction in which the slots 18 are cut. Due to the fact that the wedge is slightly wider than the width of the stator slot, the wedge tangs will be deflected toward the center of the wedge when the wedge is inserted in the stator. The wedge tangs 19 in their compressed condition bind the wedge to the adjacent punching faces 12 (Fig. 3) to lock the wedge in place. This self locking action prevents any axial movement in the wedge slot. The "pitch" or axial spacing, angle, depth and width of the slot can be varied depending on the degree of tightness desired. Good results have been obtained by using a narrow slot, for example, having a width on the order of $\frac{1}{16}''$ for a wedge having a width on the order of 1", and an angle of 30° with the horizontal. This width allows the wedge tangs to flex sufficiently to provide the compressive force or spring action required to hold the wedge in place. At the same time a slot this narrow will prevent deformation to such an extent that the material of the wedge would be permanently deformed.

While it will be obvious to those skilled in the art that the slots can be cut by many processes, a most economical way to form them is by means of a plurality of rotary saws on a common shaft arranged so that all slots in a given portion 16 can be cut at one pass.

With the modification of Fig. 3 a plurality of longitudinally spaced wedges are used in each stator slot with each of them being used in turn to drive in the preceding wedge or wedges, so that finally a multiplicity of wedges is arranged end for end to fill the respective winding slot.

In operation, the flexible fingers 19 extending through each wedge gives it flexibility so that it may be assembled in laminated slots of varying dimensions without wearing off, thus resulting in a better assembled fit which will remain tight without requiring additional support. This construction eliminates certain difficulties which have been had in the past where glued parts tended to age due to the high temperature operation. Furthermore, a wedge of the material suggested herein will have greater resistance to heat than conventional wood wedges (which char at a relatively low temperature), and will not shrink after installation. With the use for which the wedge is intended, the plastic material is mainly in compression producing very little shearing force and the plastic will not fail due to shearing forces even through large forces are applied at the time that the individual wedges are pounded into the dovetail slots designed to accommodate them.

It is to be noted that the improved slot wedge, although hard to drive out can be driven out in the same direction it was put in. Since the wedges are not necessarily damaged during assembly or removal, they can be reused if desired.

While I have illustrated and described a particular embodiment of my invention, modifications thereof will occur to those skilled in the art. For instance the pitch, angle, depth, and width of the slot can be varied according to the tightness, stresses, and deflection desired. Another modification within the scope of this invention is to provide the wedge with flexible fingers along only one edge. It is, of course, desired to cover by the appended claim all such modifications as fall within the true spirit and scope of the invention.

What I claim as new and desire to secure by Letters Patent of the United States is:

A slot wedge for a laminated core of a dynamo-electric machine or the like comprising an elongated body of a molded resinous material having along each longitudinal edge thereof a plurality of longitudinally spaced dovetail tapered side portions separated by longitudinally spaced perpendicular squared off side portions, each of the dovetail tapered side portions having a plurality of parallel, longitudinally spaced flexible finger portions defined by transverse slots disposed at an acute angle to the side edges of the wedge and extending through the entire depth of the dovetail side portions and forming a sharp corner at the vertex of said acute angle, whereby the wedge may be driven past slight discontinuities in the slot wall formed by misaligned laminations without planing off the side face portions and with said sharp corners of the flexible fingers engaging said discontinuities to positively prevent the wedge backing out of the slot.

References Cited in the file of this patent

UNITED STATES PATENTS

| | | |
|---|---|---|
| 1,154,496 | Emmet | Sept. 21, 1915 |
| 2,569,278 | Barth | Sept. 25, 1951 |

FOREIGN PATENTS

| | | |
|---|---|---|
| 245,805 | Germany | Apr. 18, 1912 |